June 28, 1927.
A. V. RACKSTRAW
1,633,752
BORING MACHINE HEAD
Filed Oct. 27, 1926.
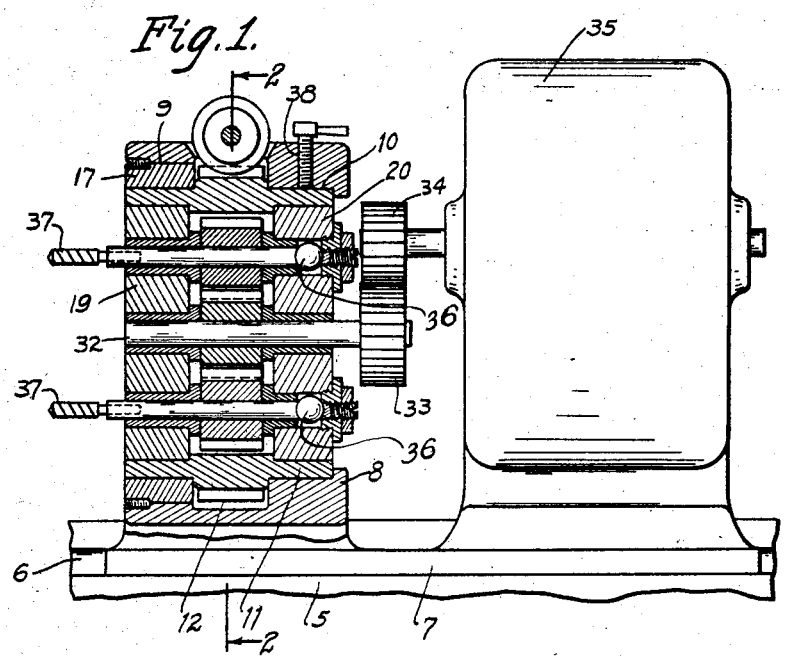
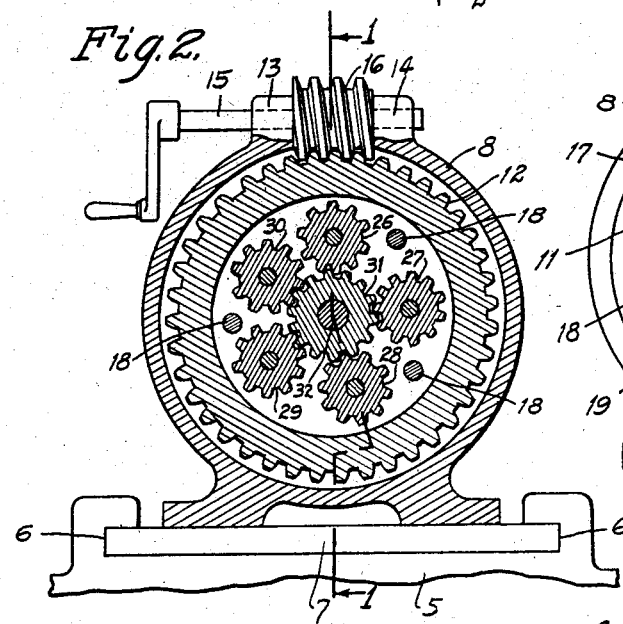
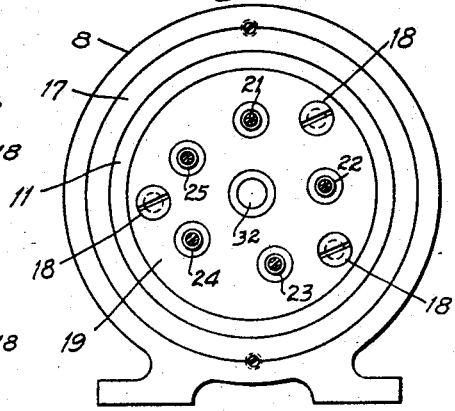
INVENTOR.
Albert V. Rackstraw
BY
Robt. W. Pearson
ATTORNEY.

Patented June 28, 1927.

1,633,752

UNITED STATES PATENT OFFICE.

ALBERT V. RACKSTRAW, OF LOS ANGELES, CALIFORNIA.

BORING-MACHINE HEAD.

Application filed October 27, 1926. Serial No. 144,558.

This invention relates to boring machine heads, especially adapted for use where duplicate holes of extreme accuracy are required, such for instance, in the boring of dowel or screw holes in furniture, pianos, sash and doors, and in all other high grade fixtures.

The main object of the invention is to provide a machine of the character above described where it is desired that two or more holes having various centers may be bored simultaneously and exactly and accurately duplicated at any desired time, thus making all work done on this machine interchangeable and affording a wide range of selective distances between the holes.

The above and other objects of the invention will be more fully disclosed in the following specification and will be exemplified in the accompanying drawings, in which:

Figure 1 is a vertical section through a machine embodying my invention taken on line 1—1 of Figure 2, the motor for driving the same being shown in full lines.

Figure 2 is a transverse section through the same, taken on the line 2—2 of Figure 1.

Figure 3 is a front view of the boring machine head.

In carrying out the invention 5 represents a standard provided with the ways 6 in which a plate 7 is adapted to slide and to be moved back and forth therein by any desired feed mechanism, not shown.

Secured on the plate 7 is an annular block or casing 8 which is provided with two centrally disposed bores 9 and 10 the bore 10 being of smaller diameter than the bore 9. Mounted to rotate in bore 10 is an annular sleeve 11 which is provided with circumferential worm gear teeth 12, and journaled in bearings 13 and 14 formed on casing 8 is a shaft 15 having keyed thereto a worm 16 which meshes with the teeth 12 of the sleeve 11.

A ring member 17 is secured in the bore 9 and forms a bearing for the opposite side of the sleeve 11.

Secured in opposite ends of sleeve 11 by means of screws 18 are bearing blocks 19 and 20 which are provided with a plurality of circumferentially disposed bearings in which the chuck spindles 21, 22, 23, 24 and 25 are journaled and secured to these spindles and disposed between the bearing blocks 19 and 20, are respectively the spur gears 26, 27, 28, 29 and 30 adapted to mesh with a centrally disposed gear 31 secured to a shaft 32 which is journaled in bearings formed in bearing blocks 19 and 20.

The shaft 32 extends outwardly beyond the block 20 and has secured thereto a gear 33 which meshes with a gear 34 secured to the shaft of an electric motor 35 which in turn is mounted on the slide plate 7 and adapted to slide in union with the head.

The rear ends of the spindles 21, 22, 23, 24 and 25 are each provided with a thrust bearing 36 and the front ends thereof are each provided with chuck sockets in which boring drills 37 may be engaged.

The drill spindles are so disposed that the distances between them vary, thus enabling the operator to place drills in the spindles desired in order to bore a pair or group of holes at any desired distance apart, in explanation, the distance between spindles 21 and 25 may be one inch, the distance between spindles 25 and 24 one and a quarter inches, between spindles 24 and 23 one and a half inches, between spindles 23 and 22 one and three quarters inches, between spindles 22 and 21 two inches and the distances betweer 21 and 23, 21 and 24, 22 and 24 and so on, may be any dimension which figures out.

The material to be operated on may be placed in front of the drills 37 and adjusted and held in position in any suitable manner and the drill head moved toward the material in any suitable manner to perform the drilling operation.

It will be seen by the above described construction that two or more drills may be operated at the same time and that they may be adjusted with respect to the work by manipulating the crank handle secured to shaft 15, and then the desired holes may be drilled in the work and such holes will always be identically spaced apart in succeeding pieces of work and each succeeding piece of work bored on this machine will be interchangeable when placed in use. It is also to be noted that when the motor is in action the shaft 32 is rotated through the medium of the gears 34 and 33 thus causing the spindles to rotate through the medium of the gear 31 which meshes with the gears on various spindles as described.

When the bearing blocks are adjusted to bring the desired spindles into the desired relation with the work, they may be firmly locked in such adjusted position by means of the set bolt 38 which is threaded into the casing 8 and is adapted to impinge with the surface of the sleeve 11 as clearly shown in Figure 1 of the drawings.

Having thus described my invention what I claim is:

1. A boring machine comprising a casing, a sleeve journaled in said casing, a centrally disposed shaft journaled in said sleeve provided with a gear, a plurality of irregularly spaced spindles journaled in said sleeve surrounding said centrally disposed shaft provided with gears meshing with the gear on said centrally disposed shaft, worm teeth on the periphery of said sleeve, a worm journaled in said casing adapted to engage with said worm teeth, and means for rotating said worm.

2. A boring machine comprising a slidably mounted casing, a sleeve journaled in said casing, a centrally disposed shaft journaled in said sleeve provided with a gear, a plurality of irregularly spaced spindles journaled in said sleeve surrounding said centrally disposed shaft provided with gears meshing with the gear on said centrally disposed shaft, worm teeth on the periphery of said sleeve, a worm journaled in said casing adapted to engage with said worm teeth, means for rotating said worm, and a set screw threaded into said casing and adapted to engage with the periphery of said sleeve for locking said sleeve with respect to said casing.

In testimony whereof I affix my signature.

ALBERT V. RACKSTRAW.